(12) United States Patent
Seto et al.

(10) Patent No.: US 6,436,860 B2
(45) Date of Patent: Aug. 20, 2002

(54) ULTRAVIOLET/INFRARED ABSORBENT LOW TRANSMITTANCE GLASS

(75) Inventors: Hiromitsu Seto; Shigekazu Yoshii, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 32 days.

(21) Appl. No.: 09/761,585

(22) Filed: Jan. 18, 2001

(30) Foreign Application Priority Data

Jan. 24, 2000 (JP) ........................................ 2000-014757

(51) Int. Cl.⁷ ............................. C03C 3/087; C03C 4/08
(52) U.S. Cl. ........................... 501/71; 501/70; 501/64
(58) Field of Search ...................... 501/70, 71, 64

(56) References Cited

U.S. PATENT DOCUMENTS

| | | | | |
|---|---|---|---|---|
| 5,308,805 A | * | 5/1994 | Baker et al. | 501/71 |
| 5,393,593 A | | 2/1995 | Gulotta et al. | 501/71 |
| 5,582,455 A | * | 12/1996 | Casariego et al. | 501/71 |
| 5,877,103 A | * | 3/1999 | Dupont et al. | 501/71 |
| 5,952,255 A | * | 9/1999 | Seto et al. | 501/71 |
| 6,274,523 B1 | * | 8/2001 | Krumwiede et al. | 501/71 |
| 6,287,998 B1 | * | 9/2001 | Seto et al. | 501/71 |

FOREIGN PATENT DOCUMENTS

| | | |
|---|---|---|
| EP | 0 825 156 | 2/1998 |
| EP | 0 842 906 | 5/1998 |
| EP | 0 947 476 | 10/1999 |
| EP | 0 952 123 | 10/1999 |
| JP | 7-29813 | 4/1995 |
| JP | 7-508971 | 10/1995 |
| JP | 8-157232 | 6/1996 |
| WO | 94/25408 | 11/1994 |

* cited by examiner

*Primary Examiner*—Karl Group
(74) *Attorney, Agent, or Firm*—Kanesaka & Takeuchi

(57) ABSTRACT

The ultraviolet/infrared absorbent low transmittance glass has a grayish, almost neutral color shade, low visible light transmittance, low total solar energy transmittance, and low ultraviolet transmittance, and is suitable for a rear window of a vehicle and capable of protecting privacy. The glass consists of base glass including: 65 to 80 wt. % $SiO_2$; 0 to 5 wt. % $Al_2O_3$; 0 to 10 wt. % MgO; 5 to 15 wt. % CaO wherein a total amount of MgO and CaO is 5 to 15 wt. %; 10 to 18 wt. % $Na_2O$; 0 to 5 wt. % $K_2O$ wherein a total amount of $Na_2O$ and $K_2O$ is 10 to 20 wt. %; and 0 to 5 wt. % $B_2O_3$, and colorants including: 1.0 to 1.6 wt. % total iron oxide ($T$-$Fe_2O_3$) expressed as $Fe_2O_3$; more than 0.019 wt. % and equal to or less than 0.05 wt. % CoO; more than 0.0008 wt. % and equal to or less than 0.003 wt. % Se; and more than 0.05 wt. % and equal to or less than 0.1 wt. % NiO. The glass with any one of thicknesses between 1.8 mm and 5 mm has a visible light transmittance (YA) measured by the C.I.E. illuminant "A" in a range from 5 to 25%, a solar energy transmittance (TG) of 5 to 25%, and an ultraviolet transmittance (Tuv) specified by ISO of not greater than 15%.

8 Claims, No Drawings

ULTRAVIOLET/INFRARED ABSORBENT LOW TRANSMITTANCE GLASS

BACKGROUND OF THE INVENTION AND RELATED ART STATEMENT

The present invention relates to an ultraviolet/infrared absorbent low transmittance glass. More particularly, it relates to an ultraviolet/infrared absorbent low transmittance glass which has a grayish shade and which has low visible light transmittance, low solar energy transmittance, and low ultraviolet transmittance, so that it is useful for windows of vehicles or buildings particularly for a privacy protecting glass in a rear window of a vehicle.

Recently, a variety of glasses with ultraviolet/infrared absorptivity to be used as a vehicle windshield have been proposed with the view of preventing degradation of luxurious interior materials and reducing cooling load of the vehicle. In view of privacy protection, a glass with relatively low visible light transmittance is preferably used for a rear window glass of a vehicle. Such kinds of glass include the followings.

For example, a dark gray colored infrared absorbent glass disclosed in Japanese Patent H7-29813B consists of soda-lime-silica glass including colorants consisting of 1.00 to 1.7 weight percent $Fe_2O_3$ (total iron), at least 0.27 weight percent FeO, 0.002 to 0.005 weight percent Se, and 0.01 to 0.02 weight percent CoO. The glass exhibits luminous transmittance less than 32 percent and total solar infrared transmittance less than 15 percent at a thickness of 3.9 mm.

A dark gray colored glass disclosed in Japanese Patent H8-157232A consists of soda-lime-silica glass including colorants consisting of 0.8 to 1.4 weight percent $Fe_2O_3$ (total iron), less than 0.21 weight percent FeO, 0.05 to 1.0 weight percent $TiO_2$, 0.02 to 0.05 weight percent CoO, and 0.0005 to 0.015 weight percent Se.

A neutral gray colored glass disclosed in claim 25 of U.S. Pat. No. 5,393,593 consists of soda-lime-silica glass including colorants consisting of 1.00 to 2.2 weight percent $Fe_2O_3$ (total iron), at least 0.20 weight percent FeO, 0.0005 to 0.005 weight percent Se, and 0.010 to 0.030 weight percent CoO. The glass exhibits luminous transmittance less than 35 percent and total solar infrared transmittance less than 20 percent at a thickness of 3.9 mm.

A glass disclosed in PCT (Japanese phase) H7-508971 consists of soda-lime-silica glass including colorants consisting of 1.3 to 2.0 weight percent of $Fe_2O_3$ (total iron), about 0.01 to 0.05 weight percent of NiO, about 0.02 to 0.04 weight percent of $Co_3O_4$, about 0.0002 to 0.003 weight percent of Se and having a ferrous iron value of 18 to 30 weight percent and less than 0.53 of a light and shade coefficient.

In both the dark gray colored infrared absorbent glass disclosed in Japanese Patent H7-29813B and the neutral gray colored glass disclosed in U.S. Pat. No. 5,393,593, a great quantity of Se is used for providing a desirable color. Such a great quantity of Se is unpreferable for the environment because Se has toxicity and is easy to vaporize. The above dark gray glass disclosed in Japanese Patent H8-157232A including 0.05 to 1.0 weight percent $TiO_2$ as an essential component is unpreferable because $TiO_2$ is expensive to increase the batch cost.

The aforementioned glass includes selenium in high concentration to provide optical properties, without essentially including nickel.

The glass disclosed in PCT (Japanese phase) H7-508971 is prepared from standard soda-lime-silica glass to which iron oxide, cobalt oxide, nickel oxide and selenium are added in a specific ratio. However, the glass composition disclosed therein has a great content of selenium and small of nickel oxide.

OBJECT AND SUMMARY OF THE INVENTION

It is an object of the present invention to provide an ultraviolet/infrared absorbent low transmittance glass which has a grayish, almost neutral color shade and which has low visible light transmittance, low solar energy transmittance and low ultraviolet transmittance so that it is useful for a window of a vehicle or a building particularly for a privacy protecting glass of a rear window of a vehicle.

The ultraviolet/infrared absorbent low transmittance glass of the present invention consists of a base glass, that is, the major constituents comprising:

- 65 to 80 wt. % $SiO_2$;
- 0 to 5 wt. % $Al_2O_3$;
- 0 to 10 wt. % MgO;
- 5 to 15 wt. % CaO wherein a total amount of MgO and CaO is between 5 and 15 wt. %;
- 10 to 18 wt. % $Na_2O$;
- 0 to 5 wt. % $K_2O$ wherein a total amount of $Na_2O$ and $K_2O$ is between 10 and 20 wt. %; and
- 0 to 5 wt. % $B_2O_3$, and a colorant including:
- 1.0 to 1.6 wt. % total iron oxide (T-$Fe_2O_3$) expressed as $Fe_2O_3$;
- more than 0.019 wt. % and equal to or less than 0.05 wt. % CoO;
- more than 0.0008 wt. % and equal to or less than 0.003 wt. % Se; and
- more than 0.05 wt. % and equal to or less than 0.1 wt. % NiO, wherein the glass with any one of thicknesses in the range of 1.8 mm to 5 mm has a visible light transmittance (YA) measured by the C.I.E. illuminant "A" in the range from 5 to 25%, a solar energy transmittance (TG) of 5 to 25%, and an ultraviolet transmittance (Tuv) specified by ISO of not greater than 15%.

The glass of the present invention contains undesirable Se in a smaller amount than the glass of the prior art, and the glass of the present invention contains nickel oxide as a colorant instead of Se in a larger amount than the glass of the prior art.

That is, it has been understood conventionally that adding nickel to glass is unpreferable because of formation of nickel sulfide stones. However, the formation of nickel sulfide stones is more strongly dependent on the size of nickel grains added in the batch or redox of the glass than the concentration of NiO. When the concentration of NiO in the glass is too high, there is a possibility that NiO coagulates to form the nickel sulfide stones. However, when nickel is contained in a range defined by the present invention, the glass can be provided with the desired color shade without producing the nickel sulfide stones.

DETAILED DESCLIPTION OF PREFERRED EMBODIMENTS

The description will be made as regard to an ultraviolet/infrared absorbent low transmittance glass composition. It should be noted that components will be represented with percentage by weight.

$SiO_2$(silica) is a principal component for forming skeleton of glass. Less than 65% $SiO_2$ lowers the durability of the glass and more than 80% $SiO_2$ raises the melting temperature of the glass so high.

$Al_2O_3$ is a component for improving the durability of the glass. More than 5% $Al_2O_3$ raises the melting temperature of the glass so high. The preferable range of $Al_2O_3$ is between 0.1% and 2%.

MgO and CaO improve the durability of the glass and adjust a devitrification temperature and viscosity of the glass during molding. More than 10% MgO raises the devitrification temperature. Less than 5% or more than 15% CaO raises the devitrification temperature of the glass. The durability of the glass is lowered when the total amount of MgO and CaO is less than 5%, while the devitrification temperature is increased when the total exceeds 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 18% or the total of $Na_2O$ and $K_2O$ exceeds 20%. $K_2O$ is preferable not to exceed 5% because of its expensive cost.

$B_2O_3$ is a component for improving the durability of the glass, prompting to melt, and yet enhancing the ultraviolet absorption. $B_2O_3$ should be less than 5%, since difficulties during molding are caused due to the vaporization of $B_2O_3$ when $B_2O_3$ exceeds 5%.

Iron oxide is present in the form of $Fe_2O_3$ and the form of FeO in the glass. $Fe_2O_3$ is a component for improving the ultraviolet absorptivity and FeO is a component for improving the heat rays absorptivity.

When the total amount of iron oxide (T-$Fe_2O_3$) expressed as $Fe_2O_3$ is less than 1.0%, the efficiency of ultraviolet and infrared absorptivity becomes small so as not to provide desired optical properties. On the other hand, when T-$Fe_2O_3$ exceeds 1.6%, temperature in the top of the furnace might exceed the heat resistant temperature of the furnace while melting the glass due to radiant heat which is generated by the effect of heat rays absorption of iron oxide. When T-$Fe_2O_3$ exceeds 1.6%, it takes long time to change composition of the molten glass in case that the glass is produced continuously in the furnace. The desirable content of T-$Fe_2O_3$ is not more than 1.5%.

Particularly, when T-$Fe_2O_3$ is not less than 1.2%, sufficient ultraviolet and infrared absorptivity can be obtained.

$Fe_2O_3$ has a function of particularly increasing the absorptivity in ultraviolet range when glass is reinforced by air blast cooling. This means that the glass of this invention can obtain enough efficiency of ultraviolet absorptivity without using expensive ultraviolet absorbent such as $CeO_2$ and $TiO_2$. When T-$Fe_2O_3$ is in the range mentioned above, the desired color shade of the glass can be obtained after discoloration due to the reinforcement process by air blast cooling.

When the FeO/T-$Fe_2O_3$ ratio (a weight of FeO expressed as $Fe_2O_3$ against T-$Fe_2O_3$) is too low, the heat rays absorptivity can not be obtained sufficiently because of a small amount of FeO. Many bubbles are also formed in the molten glass because the molten glass is relatively oxidative so that the product yield is lowered. When the FeO/T-$Fe_2O_3$ ratio is too high, the visible light transmittance is reduced and the color is of a blue tint. In addition, nickel sulfide stones are sometimes present in the molten glass because the molten glass is relatively reductive. Too high ratio of FeO/T-$Fe_2O_3$ is also unpreferable since it causes streaks with enough silica and silica scum.

In the present invention, the FeO/T-$Fe_2O_3$ ratio in a range between 0.15 and 0.50 brings a neutral color shade having high ultraviolet absorptivity and high heat rays absorptivity. In this case, values expressed as $Fe_2O_3$ are used for the content of FeO.

CoO is a component for forming a grayish shade by cooperating with Se and/or NiO, and $Fe_2O_3$ for controlling the visible light transmittance. Equal to or less than 0.019% CoO can not form a desired grayish color shade and makes the visible light transmittance too high. More than 0.05% CoO makes the color too blue tint and reduces the visible light transmittance.

Se contributes a pink color, so that it reduces the excitation purity with the aid of a complementary color of CoO. When the content of Se is equal to or less than 0.0008%, the glass cannot be provided with the desired grayish shade. And when the content of Se is equal to or more than 0.003%, the glass is lowered in the visible light transmittance. The content of Se is preferable to be in the range of 0.001 to 0.003%, particularly in the range of 0.001 to 0.0018%.

NiO is a component for controlling the visible light transmittance and for reducing the excitation purity as like as CoO. NiO has an absorptivity in a wide infrared range, so that it is a component for reducing the solar energy transmittance as like as FeO. Less then 0.05% NiO cannot form a desired color shade. To reduce the solar energy transmittance requires a large amount of FeO which causes difficulties on the production of the glass. When NiO is more than 0.1%, nickel sulfide stones are sometimes present in the product and the visible light transmittance is reduced. In addition, the obtained glass becomes tinged with smoky brown.

It is known that the coordination number of NiO varies according to the rate of cooling glass so that the color of the glass varies. This is because the cooling treatment varies the coordination number of oxide around $Ni^{2+}$ from 6 into 4 and thus varies the optical absorption. The absorption of $Ni^{2+}$ with octahedral coordination exists around 430 nanometers so as to contribute yellow to the glass, while the absorption of $Ni^{2+}$ with tetrahedral coordination exists from 500 to 640 nanometers. Therefore, the excitation purity would be reduced to obtain the preferable shade by using $Ni^{2+}$ with the tetrahedral coordination.

Windshields of passenger cars are normally reinforced by air blast cooling for safety. The reinforcement process by air blast cooling improves the absorption of NiO with tetrahedral coordination, and reduces the visible light transmittance. Although the reinforcement process by air blast cooling reduces the absorption of visible lights, the variations of NiO increases the absorption. The composition of the glass of the present invention is determined such that the optical properties of the glass after the reinforcement process fall in the desired range.

$CeO_2$ is a component for improving the ultraviolet absorptivity and is present in the form of $Ce^{3+}$ or in the form of $Ce^{4+}$ in the glass. Particularly, $Ce^{3+}$ is effective in absorbing ultraviolet with less absorptivity in the visible range. In the present invention, oxide of $Ce^{3+}$ is also expressed in terms of $CeO_2$ and is included in the total amount of $CeO_2$.

$TiO_2$ is a component for improving the ultraviolet absorptivity particularly by interaction with FeO. $TiO_2$ can be added in order to improve the ultraviolet absorptivity within such a range as not to lose the grayish, almost neutral color shade, or in order to add a yellow tint so as to obtain the desired color shade. The use of expensive $CeO_2$ and $TiO_2$ increases the cost, so that it is preferable not to use more than 2% $CeO_2$, and more than 0.5% $TiO_2$.

One or more than two among MnO, $V_2O_5$, $MoO_3$, CuO, $Cr_2O_3$, and the like may be added as colorant and $SnO_2$ as a reducing agent within a range from 0% to 1% in total may be added to the glass in such a range as not to lose middle transmittance and the grayish, almost neutral shade within the scope of the present invention. To further securely prevent the formation of nickel sulfide stones, zinc compound such as ZnO may be added in a range from 0% to 1%.

In the present invention, the glass is preferable to be reinforced by the air blasting. The desired color shade and optical properties are obtained in the reinforced process when the glass has the composition of the present invention.

In the reinforcement process, the glass plate produced from the molten glass is reheated at 600 to 750° C. for 2 to 5 minutes, and then, cooled by blasting air of 10 to 30° C. at a cooling rate of 100 to 300° C./sec.

The air blasting reinforcement process makes the glass plate comprising NiO and $Fe_2O_3$ to have a grayish shade, and to have the low visible light transmittance and the low ultraviolet transmittance while keeping the high heat rays absorptivity.

In the present invention, when measured by using C.I.E standard illuminant "A", the glass with any one of thicknesses between 1.8 to 5 mm has a visible light transmittance (YA) in the range from 5 to 25%, a solar energy transmittance (TG) of 5 to 25% and a ultraviolet transmittance (Tuv) defined by ISO of not greater than 15%, particularly of not greater than 10%.

In case of using L* a* b* color system, the chromaticity, expressed as a* and b*, of the glass color are preferably in ranges of $-6 \leq a^* \leq 3$ and $-3 \leq b^* \leq 6$, respectively.

When the glass is used in a rear window of a vehicle for the privacy protection, since almost neutral colored glass is particularly preferred, the chromaticity is further preferable to be in the ranges of $-2 \leq a^* \leq 2$ and $-2 \leq b^* \leq 2$.

When measured by using C.I.E. standard illuminant "C" over the wavelength range from 380 to 770 nanometers, the glass of the present invention preferably has optical properties with a dominant wavelength (λd) in the range from 450 to 600 nanometers and an excitation purity (Pe) of equal to or less than 8% in case the glass has a thickness of 4 mm.

Hereinafter, the mode of carrying out the present invention will be described referring to examples.

EXAMPLES 1 THROUGH 10, COMPARATIVE EXAMPLES 1 THROUGH 4

Glass raw material is prepared by adding required composition consisting of ferric oxide, titanium oxide, cobalt oxide, metallic selenium, and nickel oxide into a standard soda-lime-silica glass batch composition, also adding carbonaceous reducing agent (concretely, coke powder etc.) at a ratio of about 0.01 parts by weight per 100 parts of the glass raw material therein to be mixed. The glass raw material thus prepared is heated and melted in an electric furnace at 1500° C. for 4 hours. The molten glass is flowed onto a stainless plate and annealed to the room temperature to obtain a 6 mm thick glass plate. After polishing the glass plate in such a manner that the thickness reduces to 4 mm, the glass plate is reinforced with reheating it at 700° C. for 5 minutes and then cooling it with 20° C. air blast at 31.4 to 20.6 MPa wind pressure and 0.7 to 0.6 $Nm^3$/min wind flow to become a sample. Each sample is measured in the visible light transmittance (YA) by the C.I.E. illuminant A, the solar energy transmittance (TG), the ultraviolet transmittance (Tuv) by ISO 9050, the dominant wavelength (λd) by the illuminant C, and the excitation purity (Pe). And, L*, a* and b* are also measured following C.I.E.L.A.B.

Tables 1 through 3 show the base glass compositions of the obtained samples, $T-Fe_2O_3$ concentration, FeO (expressed as $Fe_2O_3$) concentration, FeO (expressed as $Fe_2O_3$)/$T-Fe_2O_3$ rate, CoO concentration, Se concentration, NiO concentration, and $TiO_2$ concentration. The numerals in Tables are indicated as a percentage of the weight except that CoO concentration, Se concentration, and NiO concentration are expressed in ppm. Tables 1 through 3 also show the optical properties of the respective samples.

TABLE 1

| Example | 1 | 2 | 3 | 4 | 5 |
|---|---|---|---|---|---|
| base glass composition [wt. %] | | | | | |
| $SiO_2$ | 71.8 | 71.8 | 71.8 | 71.8 | 71.8 |
| $Al_2O_3$ | 1.7 | 1.7 | 1.7 | 1.7 | 1.7 |
| MgO | 3.8 | 3.8 | 3.8 | 3.8 | 3.8 |
| CaO | 7.8 | 7.8 | 7.8 | 7.8 | 7.8 |
| $Na_2O$ | 13.9 | 13.9 | 13.9 | 13.9 | 13.9 |
| $K_2O$ | 1.0 | 1.0 | 1.0 | 1.0 | 1.0 |
| $B_2O_3$ | 0 | 0 | 0 | 1.0 | 0 |
| $T-Fe_2O_3$ | 1.21 | 1.21 | 1.21 | 1.21 | 1.10 |
| FeO | 0.278 | 0.280 | 0.278 | 0.278 | 0.269 |
| $FeO/T-Fe_2O_3$ (%) | 23.0 | 23.1 | 23.0 | 23.0 | 24.5 |
| $TiO_2$ | — | — | — | — | — |
| Se (ppm) | 13 | 10 | 17 | 15 | 18 |
| CoO (ppm) | 250 | 200 | 305 | 310 | 320 |
| NiO (ppm) | 550 | 510 | 550 | 550 | 550 |
| optical properties | | | | | |
| YA (%) | 12.2 | 16.1 | 9.1 | 15.4 | 14.6 |
| TG (%) | 14.8 | 16.4 | 13.6 | 20.5 | 20.8 |
| Tuv (%) | 3.20 | 4.20 | 2.19 | 3.96 | 5.19 |
| L* | 41.54 | 47.23 | 36.12 | 46.27 | 45.03 |
| a* | −1.60 | −3.06 | 0.02 | −0.88 | 0.18 |
| b* | 1.77 | 3.46 | −0.10 | −0.49 | −0.17 |
| λd | 561.3 | 561.5 | 472.5 | 488.8 | 590.7 |
| Pe (%) | 2.78 | 4.98 | 0.17 | 1.42 | 0.29 |

TABLE 2

| Example | 6 | 7 | 8 | 9 | 10 |
|---|---|---|---|---|---|
| base glass composition [wt. %] | | | | | |
| $SiO_2$ | 71.8 | 71.8 | 71.8 | 71.8 | 71.8 |
| $Al_2O_3$ | 1.7 | 1.7 | 1.7 | 1.7 | 1.7 |
| MgO | 3.8 | 3.8 | 3.8 | 3.8 | 3.8 |
| CaO | 7.8 | 7.8 | 7.8 | 7.8 | 7.8 |
| $Na_2O$ | 13.9 | 13.9 | 13.9 | 13.9 | 13.9 |
| $K_2O$ | 1.0 | 1.0 | 1.0 | 1.0 | 1.0 |
| $B_2O_3$ | 0 | 0 | 0 | 1.0 | 0 |
| $T-Fe_2O_3$ | 1.00 | 1.50 | 1.20 | 1.10 | 1.40 |
| FeO | 0.250 | 0.335 | 0.330 | 0.340 | 0.500 |
| $FeO/T-Fe_2O_3$ (%) | 25.0 | 22.3 | 27.5 | 30.9 | 35.7 |
| $TiO_2$ | — | — | — | 0.5 | — |
| Se (ppm) | 17 | 16 | 21 | 13 | 13 |
| CoO (ppm) | 310 | 350 | 370 | 460 | 240 |
| NiO (ppm) | 600 | 560 | 550 | 970 | 550 |
| optical properties | | | | | |
| YA (%) | 18.5 | 14.2 | 10.7 | 17.4 | 15.5 |
| TG (%) | 25.0 | 18.6 | 15.9 | 23.9 | 12.5 |
| Tuv (%) | 8.21 | 3.56 | 3.05 | 9.56 | 3.83 |
| L* | 50.10 | 44.46 | 38.90 | 49.48 | 46.25 |
| a* | −0.27 | −0.61 | 1.14 | −2.98 | −2.43 |
| b* | −0.34 | 0.89 | −0.09 | −2.89 | 4.88 |
| λd | 485.0 | 565.8 | 498.8 | 482.5 | 569.0 |
| Pe (%) | 0.68 | 1.39 | 1.23 | 11.49 | 7.80 |

TABLE 3

| Comparative Example | 1 | 2 | 3 | 4 |
|---|---|---|---|---|
| base glass composition [wt. %] | | | | |
| $SiO_2$ | 71.8 | 71.8 | 71.8 | 71.8 |
| $Al_2O_3$ | 1.7 | 1.7 | 1.7 | 1.7 |
| MgO | 3.8 | 3.8 | 3.8 | 3.8 |
| CaO | 7.8 | 7.8 | 7.8 | 7.8 |
| $Na_2O$ | 13.9 | 13.9 | 13.9 | 13.9 |
| $K_2O$ | 1.0 | 1.0 | 1.0 | 1.0 |
| $B_2O_3$ | 0 | 0 | 1.0 | 0 |
| $T\text{-}Fe_2O_3$ | 1.12 | 1.38 | 1.25 | 0.80 |
| FeO | 0.388 | 0.210 | 0.301 | 0.176 |
| $FeO/T\text{-}Fe_2O_3$(%) | 38.5 | 16.9 | 26.7 | 22.0 |
| $TiO_2$ | — | 0.10 | 0.03 | 0.03 |
| Se (ppm) | 19 | 43 | 15 | 11 |
| CoO (ppm) | 114 | 235 | 90 | 180 |
| NiO (ppm) | — | — | 600 | 700 |
| optical properties | | | | |
| YA (%) | 24.1 | 17.1 | 22.5 | 20.0 |
| TG (%) | 16.1 | 16.6 | 18.1 | 34.7 |
| Tuv (%) | 14.3 | 2.50 | 4.21 | 8.93 |
| L* | — | — | 53.99 | 52.09 |
| a* | — | — | −1.38 | −4.25 |
| b* | — | — | 11.77 | 2.45 |
| λd | 491.6 | 530.0 | 575.4 | 540.2 |
| Pe (%) | 3.88 | 3.90 | 18.09 | 2.72 |

Table 1 and 2 show that all glasses having a thickness of 4 mm of Examples 1 through 9 have the visible light transmittance (YA) between 5% and 25%, the solar energy transmittance (TG) of 5 to 25%, and the ultraviolet transmittance (Tuv) of not greater than 15%.

These samples have the chromaticity expressed by a* and b* in the ranges of −6≦a*≦3 and −3≦b*≦6, the dominant wavelength (λd) measured by using the illuminant "C" of 450 to 600 nanometers, and excitation purity (Pe) of equal to or less than 8%.

Therefore, when the glass compositions of the examples mentioned above are used for windshields of vehicles and windows of buildings, good effects of preventing degradation of interior materials and of privacy protecting can be obtained.

All of the samples of Comparative Examples 1 through 4 have compositions out of the range of the present invention. The glass of Comparative Example 1 has the same composition as the example of Japanese Patent H7-29813B, which shows the glass produced by the vacuum refining process, as referred in the prior art description. The glass of Comparative Example 2 has the same composition as the example of Japanese Patent H8-157232A as referred above.

It should be noted that the optical properties of the glass of Comparative Example 1 are indicated in values converted based on a glass thickness of 3.9 mm, and the optical properties of the glass of Comparative Example 2 are indicated in values converted based on a glass thickness of 5 mm.

The glass of Comparative Example 3 contains CoO as a colorant amount of which is out of the scope of the present invention, and the glass of Comparative Example 4 contains $T\text{-}Fe_2O_3$ and CoO amounts of which are out of the scope of the present invention.

It is apparent from Table 3 that as compared with Examples of the present invention, the glass of Comparative Examples 1 has a very large value of $FeO/T\text{-}Fe_2O_3$ ratio in order to improve the heat rays absorptivity without including NiO. The glass of Comparative Example 1 is unpreferable to be produced in an ordinary melting furnace.

The glass of Comparative Examples 2 which does not comprise NiO is required to comprise a large amount of Se to provide the desirable color shade and optical properties.

The glass of Comparative Examples 3 has an amount of CoO out of scope of the present invention, so that the obtained shade is unpreferablly tinged with yellow.

The glass of Comparative Example 4 contains $T\text{-}Fe_2O_3$ and CoO amounts of which are out of the claimed range so that it cannot obtain sufficient heat rays absorptibity and desired color shade of the present invention.

As detailed above, according to the present invention, an ultraviolet/infrared absorbent low transmittance glass, which exhibits low visible light transmittance, low solar energy transmittance, and low ultraviolet transmittance and which has grayish shade can be provided.

The ultraviolet/infrared absorbent low transmittance glass having the grayish shade can exhibit the effect of preventing degradation and discoloration of interior materials and the privacy protecting effect when the glass is used for a rear window glass of a vehicle, a window of a building, or the like.

What is claimed is:

1. An ultraviolet/infrared absorbent low transmittance glass consisting of base glass comprising:

65 to 80 wt. % $SiO_2$;

0 to 5 wt. % $Al_2O_3$;

0 to 10 wt. % MgO;

5 to 15 wt. % CaO wherein a total amount of MgO and CaO is between 5 and 15 wt. %;

10 to 18 wt. % $Na_2O$;

0 to 5 wt. % $K_2O$ wherein a total amount of $Na_2O$ and $K_2O$ is between 10 and 20 wt. %; and 0 to 5 wt. % $B_2O_3$, and colorants comprising:

1.0 to 1.6 wt. % total iron oxide ($T\text{-}Fe_2O_3$) expressed as $Fe_2O_3$;

more than 0.019 wt. % and equal to or less than 0.05 wt. % CoO;

more than 0.0008 wt. % and equal to or less than 0.003 wt. % Se; and more than 0.05 wt. % and equal to or less than 0.1 wt. % NiO, wherein said glass with any one of thicknesses between 1.8 mm and 5 mm has a visible light transmittance (YA) by the C.I.E. illuminant "A" in a range from 5% to 25%, a solar energy transmittance (TG) in a range from 5% to 25%, and an ultraviolet transmittance (Tuv) specified by ISO of not more than 15%.

2. An ultraviolet/infrared absorbent low transmittance glass as claimed in claim 1, having a content of FeO expressed as $Fe_2O_3$ between 15 wt. % and 50 wt. % of $T\text{-}Fe_2O_3$.

3. An ultraviolet/infrared absorbent low transmittance glass as claimed in claim 1 wherein the content of $T\text{-}Fe_2O_3$ is 1.2 to 1.5 wt. %.

4. An ultraviolet/infrared absorbent low transmittance glass as claimed in claim 1, wherein the content of Se is between 0.001 wt. % and 0.003 wt. %.

5. An ultraviolet/infrared absorbent low transmittance glass as claimed in claim 4, wherein the content of Se is between 0.001 wt. % and 0.0018 wt. %.

6. An ultraviolet/infrared absorbent low transmittance glass as claimed in claim 1 wherein said colorant further comprises $CeO_2$ of not greater than 2 wt. % and/or $TiO_2$ of not greater than 0.5 wt. %.

7. An ultraviolet/infrared absorbent low transmittance glass as claimed in claim 1, wherein the glass has a grayish shade defined by the C.I.E.L.A.B. coordinates in the ranges of $-6 \leq a^* \leq 3$ and $-3 \leq b^* \leq 6$.

8. An ultraviolet/infrared absorbent low transmittance glass as claimed in claim 1, wherein the glass is reinforced by air blast cooling.

* * * * *